(12) United States Patent
Fukuhara et al.

(10) Patent No.: US 8,842,923 B2
(45) Date of Patent: Sep. 23, 2014

(54) IMAGE PROCESSING APPARATUS AND METHOD

(71) Applicant: Sony Corporation, Tokyo (JP)

(72) Inventors: Takahiro Fukuhara, Tokyo (JP); Hitoshi Kiya, Tokyo (JP)

(73) Assignees: Sony Corportion, Tokyo (JP); Tokyo Metropolitan University, Tokyo (JP)

( * ) Notice: Subject to any disclaimer, the term of this patent is extended or adjusted under 35 U.S.C. 154(b) by 132 days.

(21) Appl. No.: 13/673,264

(22) Filed: Nov. 9, 2012

(65) Prior Publication Data

US 2013/0129239 A1    May 23, 2013

(30) Foreign Application Priority Data

Nov. 17, 2011   (JP) ................................. 2011-251253

(51) Int. Cl.
*G06K 9/36* (2006.01)
*H04N 19/126* (2014.01)
*H04N 19/85* (2014.01)
*H04N 19/63* (2014.01)

(52) U.S. Cl.
CPC ............ *G06K 9/36* (2013.01); *H04N 19/00096* (2013.01); *H04N 19/00818* (2013.01); *H04N 19/00903* (2013.01)
USPC ......................................................... 382/233

(58) Field of Classification Search
None
See application file for complete search history.

(56) References Cited

U.S. PATENT DOCUMENTS

| | | | | |
|---|---|---|---|---|
| 5,974,183 | A * | 10/1999 | Wilkinson | 382/236 |
| 7,127,111 | B2 * | 10/2006 | Fukuhara et al. | 382/232 |
| 7,298,915 | B2 * | 11/2007 | Fukuhara et al. | 382/248 |
| 7,315,651 | B2 * | 1/2008 | Sakuyama et al. | 382/232 |
| 7,483,575 | B2 * | 1/2009 | Fukuhara et al. | 382/232 |
| 7,925,102 | B2 * | 4/2011 | Fukuhara et al. | 382/232 |
| 2005/0134701 | A1 * | 6/2005 | Iwakiri | 348/222.1 |

OTHER PUBLICATIONS

"High-Dynamic-Range Still-Image Encoding in JPEG 2000". IEEE Computer Graphics and Applications. Nov./Dec. 2005, pp. 57-64.

* cited by examiner

*Primary Examiner* — Bhavesh Mehta
*Assistant Examiner* — Feng Niu
(74) *Attorney, Agent, or Firm* — Frommer Lawrence & Haug LLP; William S. Frommer

(57) ABSTRACT

There is provided an image processing apparatus including a quantization unit that quantizes an image subjected to logarithmic conversion such that a quantization error is focused on a luminance region in which expansion of an error caused due to logarithmic inverse-conversion which is inverse conversion of the logarithmic conversion is relatively small or a luminance region in which no expansion of the error occurs; and an encoding unit that encodes an index image obtained through the quantization by the quantization unit.

20 Claims, 13 Drawing Sheets

FIG. 2
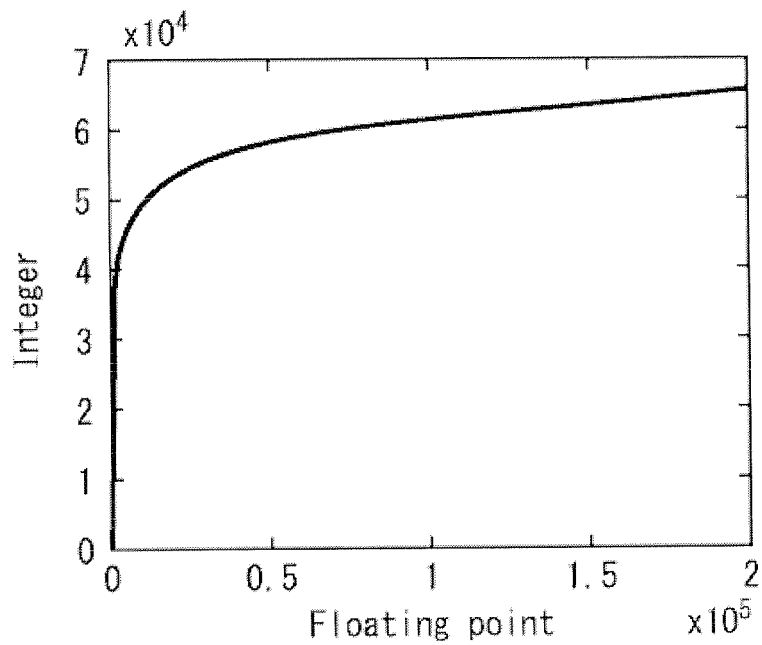
PREPROCESSING FUNCTION
A
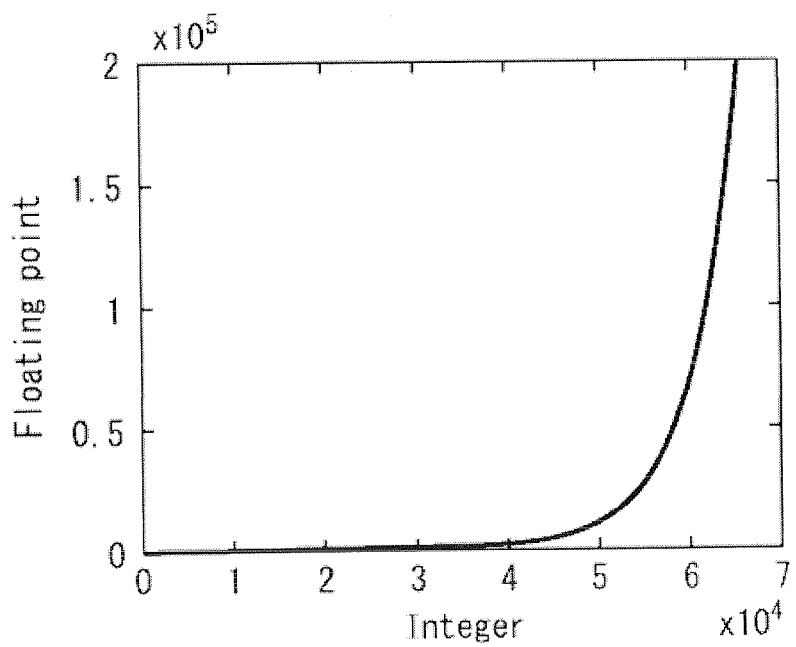
INVERSE-PROCESSING FUNCTION
B

FIG. 12

| Image | Method | SNR (HDR) | File Size[Kb] |
|---|---|---|---|
| nave | SUGGESTED METHOD | 47.18 | 61022 |
|  | PAST METHOD [4] | 32.20 | 61290 |
|  | LLOYD[9] | 11.59 | 63344 |
| rosette | SUGGESTED METHOD | 39.71 | 117295 |
|  | PAST METHOD [4] | 37.51 | 117082 |
|  | LLOYD[9] | 24.92 | 118762 |
| memorial | SUGGESTED METHOD | 73.58 | 310807 |
|  | PAST METHOD [4] | 52.61 | 311218 |
|  | LLOYD[9] | 51.79 | 310969 |
| Desk | SUGGESTED METHOD | 44.58 | 313869 |
|  | PAST METHOD [4] | 43.77 | 316560 |
|  | LLOYD[9] | 41.21 | 315442 |
| rend02 | SUGGESTED METHOD | 63.23 | 471242 |
|  | PAST METHOD [4] | 57.74 | 471303 |
|  | LLOYD[9] | 48.01 | 471659 |
| StillLife | SUGGESTED METHOD | 54.17 | 698599 |
|  | PAST METHOD [4] | 37.06 | 698669 |
|  | LLOYD[9] | 38.28 | 703032 |
| Apartment | SUGGESTED METHOD | 67.06 | 2255955 |
|  | PAST METHOD [4] | 55.14 | 2257031 |
|  | LLOYD[9] | 61.77 | 2269255 |

IMAGE PROCESSING APPARATUS AND METHOD

BACKGROUND

The present disclosure relates to an image processing apparatus and method, and more particularly, to an image processing apparatus and method capable of improving the image quality of a decoded image.

With the high quality of images, high dynamic range (HDR) images that have a large number of gray scales per pixel have recently been spread. At present, the HDR images are applied to estimation of visual characteristics, examination of an outer appearance, or the like. In the future, the HDR images are thus expected to be applied also to fields of in-vehicle cameras, monitoring cameras, medical images, astronomical images, and the like. However, since the HDR images have a large number of gray scales per pixel, the data sizes of the HDR images are larger than those of dynamic range images according to the related art. For example, a recording load or a transmission load is larger. For this reason, compression and decompression technologies (encoding and decoding technologies) become more important when HDR images are processed than when the dynamic range images according to the related art are processed.

Several types of encoding (compression) methods for the HDR images have been suggested. For example, a method of compressing a range using a preprocessing function in a non-linear manner and performing encoding such as JPEG has been suggested (for example, see "High-Dynamic-Range Still Image Encoding in JPEG2000" by R. Xu, S. N. Pattanaik, and C. E. Hughes, IEEE Computer Graphics and Applications, vol. 25, no. 6, pp. 57 to 64, 2005). According to this method, the preprocessing function can be first applied to the entire HDR image in consideration of visual characteristics, and thus a luminance range in which the sensitivity of a human visual system (HVS) is low is compressed. In addition, linear quantization is performed to encode (compress) the image finally in conformity with the JPEG2000 scheme. Since this method is performed on the assumption of irreversible compression, this method has a superior performance to many HDR image compression methods.

SUMMARY

According to this method, however, the inverse function of the preprocessing function can be applied to a compressed image when the compressed image is restored (decoded) to the HDR image again. There is a concern that an error occurring in the irreversible compression may be amplified due to the inverse function and the image quality of the restored HDR image may thus deteriorate.

It is desirable to suppress deterioration in the image quality of a decoded image in highly efficient encoding and decoding processes.

According to an embodiment of the present disclosure, there is provided an image processing apparatus including a quantization unit that quantizes an image subjected to logarithmic conversion such that a quantization error is focused on a luminance region in which expansion of an error caused due to logarithmic inverse-conversion which is inverse conversion of the logarithmic conversion is relatively small or a luminance region in which no expansion of the error occurs; and an encoding unit that encodes an index image obtained through the quantization by the quantization unit.

The quantization unit may include a histogram generation unit that generates a histogram of each luminance value of the image subjected to the logarithmic conversion, a luminance region division unit that divides an entire luminance region of the histogram generated by the histogram generation unit into a plurality of partial luminance regions, a table generation unit that generates a quantization table indicating a correspondence relation between each luminance value and an index value and a representative value table indicating a correspondence relation between each index value and a representative value of each class for each of the partial luminance regions divided from the entire luminance region by the luminance region division unit, and an index image generation unit that generates the index image by quantizing the image subjected to the logarithmic conversion using the quantization table for each partial luminance region generated by the table generation unit.

The table generation unit may generate the quantization table and the representative value table such that, among the plurality of partial luminance regions, the quantization error is focused on the partial luminance region in which the expansion of the error caused due to the logarithmic inverse-conversion is relatively small or the partial luminance region in which no expansion of the error occurs.

The table generation unit may generate the quantization table and the representative value table for the partial luminance region in which the expansion of the error caused due to the logarithmic conversion is relatively small or the partial luminance region in which no expansion of the error occurs in accordance with a quantization method in which the quantization error occurs, and may generate the quantization table and the representative value table for the other partial luminance regions in accordance with a quantization method in which the quantization error does not occur.

The luminance region division unit may divide, using a predetermined division point as a boundary, the entire luminance region of the histogram into a low-luminance region of low luminance from the predetermined division point and a high-luminance region of high luminance from the predetermined division point. The table generation unit may generate the quantization table and the representative value table of Lloyd-Max quantization for the low-luminance region in which the expansion of the error caused due to the logarithmic inverse-conversion is relatively small or the low-luminance region in which no expansion of the error occurs, and may generate the quantization table and the representative value table of reversible quantization for the high-luminance region in which the expansion of the error caused due to the logarithmic inverse-conversion is relatively large.

The encoding unit may encode the representative value table generated by the table generation unit.

The encoding unit may add encoded data of the generated representative value table to encoded data of the generated index image.

The encoding unit may associate encoded data of the generated representative value table with encoded data of the generated index image.

The quantization unit may further include a division point setting unit that sets the division point. The luminance region division unit may divide the entire luminance region of the histogram into the low-luminance region and high-luminance region using the division point set by the division point setting unit as the boundary.

The encoding unit may encode the index image in conformity with a JPEG2000 scheme.

The image may be a high dynamic range image.

The image processing apparatus may further include a logarithmic conversion unit that performs the logarithmic conversion on an image to be encoded. The quantization unit may quantize the image subjected to the logarithmic conversion by the logarithmic conversion unit such that the quantization error is focused on the luminance region in which the expansion of the error caused due to the logarithmic inverse-conversion is relatively small or the luminance region in which no expansion of the error occurs.

The image processing apparatus may further include an integer conversion unit that performs floating point number-to-integer conversion on the image subjected to the logarithmic conversion by the logarithmic conversion unit and expressed by a floating point number. The quantization unit may quantize the image subjected to the floating point number-to-integer conversion by the integer conversion unit such that the quantization error is focused on the luminance region in which the expansion of the error caused due to the logarithmic inverse-conversion is relatively small or the luminance region in which no expansion of the error occurs.

According to another embodiment of the present disclosure, there is provided an image processing method of an image processing apparatus. The method includes: quantizing, by a quantization unit, an image subjected to logarithmic conversion such that a quantization error is focused on a luminance region in which expansion of an error caused due to logarithmic inverse-conversion which is inverse conversion of the logarithmic conversion is relatively small or a luminance region in which no expansion of the error occurs; and encoding, by an encoding unit, an index image obtained through the quantization.

According to still another embodiment of the present disclosure, there is provided an image processing apparatus including a decoding unit that decodes encoded data generated by encoding an index image which is obtained through quantization performed on an image subjected to logarithmic conversion such that a quantization error is focused on a luminance region in which expansion of an error caused due to logarithmic inverse-conversion which is inverse conversion of the logarithmic conversion is relatively small or a luminance region in which no expansion of the error occurs in accordance with a method corresponding to the encoding of generating the encoded data; and an inverse-quantization unit that performs inverse quantization corresponding to the quantization on the index image obtained by decoding the encoded data by the decoding unit.

The decoding unit may decode not only the encoded data of the index image but also encoded data of a representative value table corresponding to a quantization table applied in the quantization.

The inverse-quantization unit may perform the inverse quantization on the index image using the representative value table decoded by the decoding unit.

The image processing apparatus may further include a floating point number conversion unit that performs integer-to-floating point number conversion on the image obtained by performing the inverse quantization on the index image by the inverse-quantization unit and expressed by an integer.

The image processing apparatus may further include a logarithmic inverse-conversion unit that performs logarithmic inverse-conversion on the image obtained through the integer-to-floating point number conversion by the floating point number conversion unit and expressed by a floating point number.

According to still another embodiment of the present disclosure, there is provided an image processing method of an image processing apparatus. The method includes decoding, by a decoding unit, encoded data generated by encoding an index image which is obtained through quantization performed on an image subjected to logarithmic conversion such that a quantization error is focused on a luminance region in which expansion of an error caused due to logarithmic inverse-conversion which is inverse conversion of the logarithmic conversion is relatively small or a luminance region in which no expansion of the error occurs in accordance with a method corresponding to the encoding of generating the encoded data; and performing, by an inverse-quantization unit, inverse quantization corresponding to the quantization on the index image obtained by decoding the encoded data.

According to the embodiments of the present disclosure, an image subjected to logarithmic conversion is quantized such that a quantization error is focused on a luminance region in which expansion of an error caused due to logarithmic inverse-conversion which is inverse conversion of the logarithmic conversion is relatively small or a luminance region in which no expansion of the error occurs. An index image obtained through the quantization is encoded.

According to the embodiments of the present disclosure, encoded data generated by encoding an index image which is obtained through quantization performed on an image subjected to logarithmic conversion is decoded such that a quantization error is focused on a luminance region in which expansion of an error caused due to logarithmic inverse-conversion which is inverse conversion of the logarithmic conversion is relatively small or a luminance region in which no expansion of the error occurs in accordance with a method corresponding to the encoding of generating the encoded data. Inverse quantization corresponding to the quantization is performed on the index image obtained by decoding the encoded data by the decoding unit.

According to the embodiments of the present disclosure described above, an image can be processed. In particular, it is possible to realize highly efficient encoding while suppressing deterioration in the image quality of a decoded image.

BRIEF DESCRIPTION OF THE DRAWINGS

FIGS. 2A and 2B are diagrams illustrating logarithmic conversion and logarithmic inverse-conversion;

FIG. 12 is a diagram illustrating comparison of SNR results in encoding and decoding schemes.

DETAILED DESCRIPTION OF THE EMBODIMENTS

Figure 1:
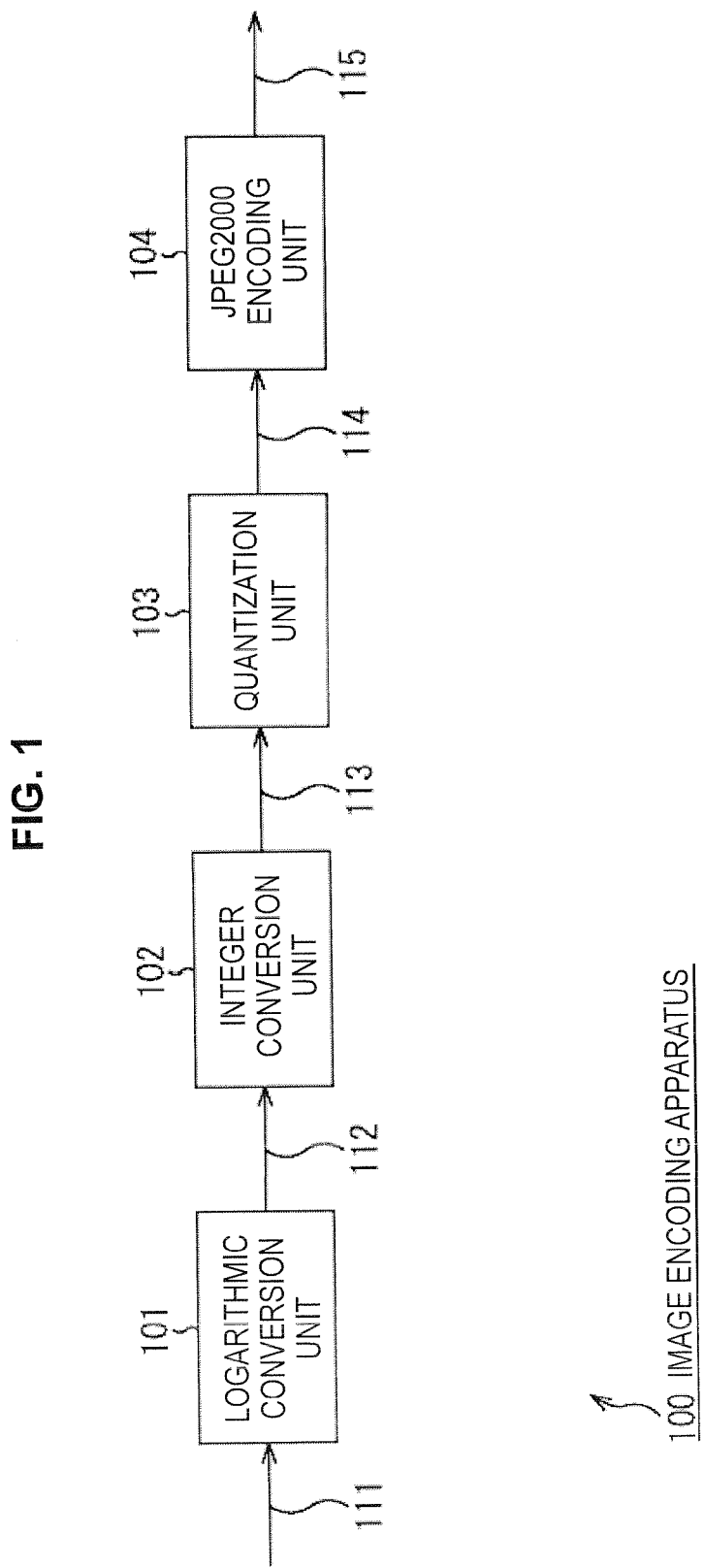
FIG. 1 is a block diagram illustrating an example of the main configuration of an image encoding apparatus.

Hereinafter, modes (hereinafter referred to as embodiments) for carrying out the disclosure will be described. The description will be made in the following order.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

1. First Embodiment (Image Encoding Apparatus)
2. Second Embodiment (Image Decoding Apparatus)
3. Third Embodiment (Simulation)
4. Fourth Embodiment (Personal Computer)

1. First Embodiment

Image Encoding Apparatus

FIG. 1 is a block diagram illustrating an example of the main configuration of an image encoding apparatus. An image encoding apparatus 100 shown in FIG. 1 encodes data (high dynamic range (HDR) image data) of an input HDR image in accordance with an irreversible method and outputs the encoded data (code stream).

As shown in FIG. 1, the image encoding apparatus 100 includes a logarithmic conversion unit 101, an integer conversion unit 102, a quantization unit 103, and a JPEG2000 encoding unit 104. That is, the image encoding apparatus 100 is an encoding apparatus that basically encodes HDR image data in conformity with an irreversible JPEG2000 encoding scheme. However, to encode an image more efficiently, the image encoding apparatus 100 compresses a luminance range in which the sensitivity of a human visual system (HVS) is low by performing preprocessing on the entire image in consideration of visual characteristics, and then performs encoding in conformity with the irreversible JPEG2000 encoding scheme.

An image (HDR image) of HDR image data 111 input to the image encoding apparatus 100 may be any image as long as the image is a high dynamic range image, and may have any bit depth of a pixel value, any data type, or the like. For example, the pixel value of the HDR image data 111 is assumed below to be expressed by a 32-bit floating point number.

The logarithmic conversion unit 101 performs logarithmic conversion on the input HDR image data 111 by Expression (1) below. Further, [R, G, B] represents RGB components of the HDR image (expressed by a 32-bit floating point number) not subjected to logarithmic conversion and [R', G', B'] represents RGB components subjected to the logarithmic conversion.

$$[R',G',B']=\log([R,G,B]) \quad (1)$$

The logarithmic conversion unit 101 supplies HDR image data 112 subjected to the logarithmic conversion to the integer conversion unit 102.

The integer conversion unit 102 performs integer conversion (also referred to as floating point number-to-integer conversion) on the HDR image data 112 supplied from the logarithmic conversion unit 101 and subjected to the logarithmic conversion to convert the HDR image data 112 into HDR image data that is expressed by an N-bit (where N is any natural number) integer f (x:N). For example, the integer conversion unit 102 converts the HDR image data 112 subjected to the logarithmic conversion using a round function, as in Expression (2) below.

$$f(x:N)=\mathrm{round}[(x-x\mathrm{min})/(x-x\mathrm{max})\times 2^N-1] \quad (2)$$

In Expression (2), xmax indicates the maximum value of each component of RGB subjected to the logarithmic conversion and xmin indicates the minimum value of each component of RGB subjected to the logarithmic conversion. Further, N indicates the number of bits subjected to the integer conversion.

The integer conversion unit 102 supplies HDR image data 113 subjected to the integer conversion to the quantization unit 103.

That is, the logarithmic conversion unit 101 and the integer conversion unit 102 convert a 32-bit floating point number (R[R, G, B]) into an N-bit integer (R[N], G[N], B[N]) by performing preprocessing, which includes the logarithmic conversion and the integer conversion (floating point number-to-integer conversion), on the input HDR image data 111 by Equation (3) below $$[R[N],G[N],B[N]]=f([R',G',B']:N) \quad (3)$$

A luminance range in which sensitivity is low in the HVS is compressed through the preprocessing. FIG. 2A is a diagram illustrating an example of a characteristic curve of a preprocessing function that includes the above-described logarithmic conversion. As shown in the example of the characteristic curve shown in the graph of FIG. 2A, a high luminance region considered as a region in which the HVS sensitivity is low is compressed in range through the logarithmic conversion included in the preprocessing. Thus, an encoding efficiency can be improved.

At the time of decoding, inverse processing is performed on the HDR image data subjected to the logarithmic conversion using an inverse-processing function corresponding to the preprocessing function. The inverse processing includes logarithmic inverse-conversion (also referred to as exponential conversion) which is the inverse processing of the logarithmic conversion included in the preprocessing or floating point number conversion (also referred to as integer-to-floating point number conversion) which is the inverse processing of the integer conversion included in the preprocessing.

For example, when the HDR image data expressed by a 32-bit floating point number is subjected to the preprocessing to be converted into the HDR image data expressed by an N-bit integer at the encoding time, the HDR image data expressed by the N-bit integer is subjected to the inverse processing to be converted into the HDR image data expressed by the 32-bit floating point number at the decoding time. When the preprocessing function is the example shown in the graph of FIG. 2A, the characteristic curve of the inverse-processing function is formed as in a function shown in the graph of FIG. 2B.

Since the encoding and decoding processes are irreversible, an error occurs in a decoded image corresponding to the image not subjected to encoding. The inverse-processing function has an influence on this error. The influence of the inverse-processing function is different depending on a density value (hereinafter, also referred to as a luminance value), as understood from the characteristic curve shown in FIG. 2B. That is, optimum encoding in which an error is the minimum in the JPEG2000 encoding scheme does not guarantee an optimum value in the HDR image (decoded image) subjected to the inverse processing. That is, even when the encoding and decoding processes are performed such that an error is the minimum, the error may not necessarily be the minimum in a decoded image.

Highly efficient encoding can be realized using the JPEG2000 encoding. However, there is a concern that the error occurring in the encoding may be amplified due to the inverse-processing function particularly in a high-luminance region.

Figure 3:
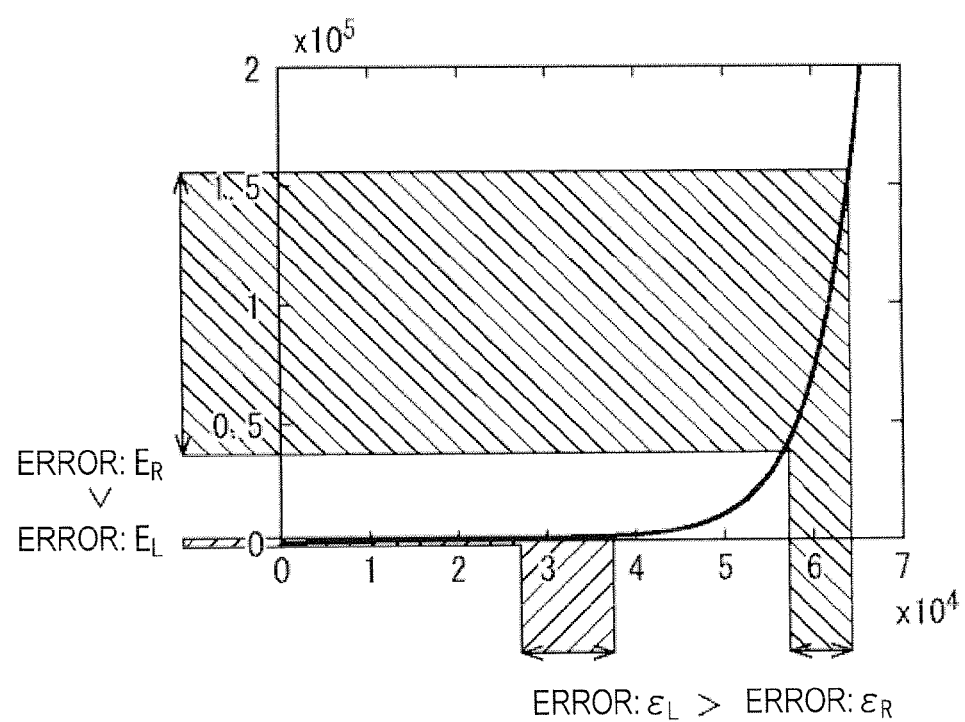
FIG. 3 is a diagram illustrating an influence of an error caused due to the logarithmic inverse-conversion.

FIG. 3 is a diagram illustrating an example of the influence of the error. As shown in FIG. 3, in the JPEG2000 encoding, it is assumed that an error $\epsilon_L$ occurs in a specific pixel in a low-luminance region and an error $\epsilon_R$ occurs in a specific pixel in a high-luminance region. In the example of FIG. 3, even when $\epsilon_L > \epsilon_R$, an error $E_L$ in the low-luminance region is less than an error $E_R$ in the high-luminance region after application of the inverse-processing function. Thus, when the inverse-processing function is applied, there is a probability that the error in the high-luminance region may increase and the error may be reversed.

Although the error occurs even in the distribution of a histogram of the HDR image compressed in range through the preprocessing, the error occurs broadly in the distribution in the high-luminance region. Accordingly, when the error increases in the high-luminance region, as described above, there is a high probability that the error increases in the entire image. That is, there is a concern that the deterioration in the image quality of the restored HDR image (decoded image) may increase.

In other words, to suppress the deterioration in the image quality of the restored HDR image (decoded image), the error in the high-luminance region in which the error may increase due to the inverse-processing function at the decoding time is preferably suppressed from occurring as much as possible (the error is focused on the low-luminance region).

Accordingly, before performing the JPEG2000 encoding, the image encoding apparatus 100 performs quantization such that a quantization error is focused on a luminance region in which the expansion of the error caused due to the inverse-processing function at the decoding time is small (or no expansion of the error occurs).

The quantization unit 103 converts HDR image data 113 expressed by an N-bit integer into index image data 114 expressed by an M-bit (where M is a natural number smaller than N) integer by quantizing the HDR image data 113. At this time, the quantization unit 103 performs the quantization such that the expansion of the error caused due to the inverse-processing function at the decoding time is small (or no expansion of the error occurs), that is, the quantization error is focused on a lower-luminance region.

For example, the quantization unit 103 performs the quantization by dividing a luminance region into a plurality of regions in a histogram of the pixel values of the HDR image data 113, performing quantization on the pixel value of a luminance region in which the expansion of the error caused due to the inverse-processing function at the decoding time is large in accordance with a method of suppressing the occurrence of the quantization error, and focusing on the quantization error on the pixel value of the luminance region in which the expansion of the error caused due to the inverse-processing function at the decoding time is small (or no expansion of the error occurs).

More specifically, for example, the quantization unit 103 divides the entire luminance region into two regions, a low-luminance region and a high-luminance region, performs reversible quantization on the pixel value of the high-luminance region in which the expansion of the error caused due to the inverse-processing function at the decoding time is relatively large, and performs irreversible quantization on the pixel value of the low-luminance region in which the expansion of the error caused due to the inverse-processing function at the decoding time is relatively small (or no expansion of the error occurs).

Thus, the quantization unit 103 can focus the quantization error on the low-luminance region in which the expansion of the error caused due to the inverse-processing function at the time of decoding is relatively small (or no expansion of the error occurs). Accordingly, since the quantization unit 103 can suppress the entire error, the deterioration in the image quality of the decoded image can be suppressed even in the highly efficient encoding and decoding processes on the HDR image.

Irreversible quantization may be used as the method of quantizing the high-luminance region, as long as the irreversible method is a method of causing the quantization error to occur less than in the method of quantizing the low-luminance region. However, reversible quantization is preferably applied to further suppress the occurrence of the error.

Any method may be used as the method of quantizing the low-luminance region, as long as the method is an irreversible method of causing the quantization error to occur less than in the method of quantizing the high-luminance region. For example, highly efficient Lloyd-Max quantization may be applied (for example, see "Least squares quantization in PCM" by Lloyd, IEEE Transactions, Information Theory, vol. IT-28, no. 2, pp. 129 to 137, March 1982).

The quantization unit 103 supplies the index image data 114 obtained through the above-described quantization to the JPEG2000 encoding unit 104. Further, in this quantization, the quantization unit 103 generates a representative value table used in the irreversible quantization at the decoding time and supplies the representative value table to the JPEG2000 encoding unit 104.

The JPEG2000 encoding unit 104 encodes the input index image data 114 in conformity with the irreversible JPEG2000 encoding scheme to generate encoded data (code stream). When the quantization unit 103 performs the above-described quantization, the irreversible encoding is performed with respect to the entire luminance region.

The JPEG2000 encoding unit 104 encodes the input representative value table to generate encoded data. The JPEG2000 encoding unit 104 multiplexes (adds) the encoded data (code stream).

The JPEG2000 encoding unit 104 outputs the generated encoded data (code stream) 115 to the outside of the image encoding apparatus 100.

Thus, the quantization unit 103 performs the quantization such that the error is focused on the luminance region in which the expansion of the error caused due to the inverse-processing function at the decoding time is relatively small (or no expansion of the error occurs). Therefore, the image encoding apparatus 100 can suppress the error in the entire luminance region and can thus suppress the deterioration in the image quality of a decoded image.

Next, the description will be made on the assumption that the quantization unit 103 divides the luminance region into two regions, a low-luminance region and a high-luminance region, in the histogram of the HDR image data 113 using a predetermined division point as a boundary, performs reversible quantization on the pixel value of the high-luminance region, and performs Lloyd-Max quantization on the pixel value of the low-luminance region.

Quantization Unit

Figure 4:
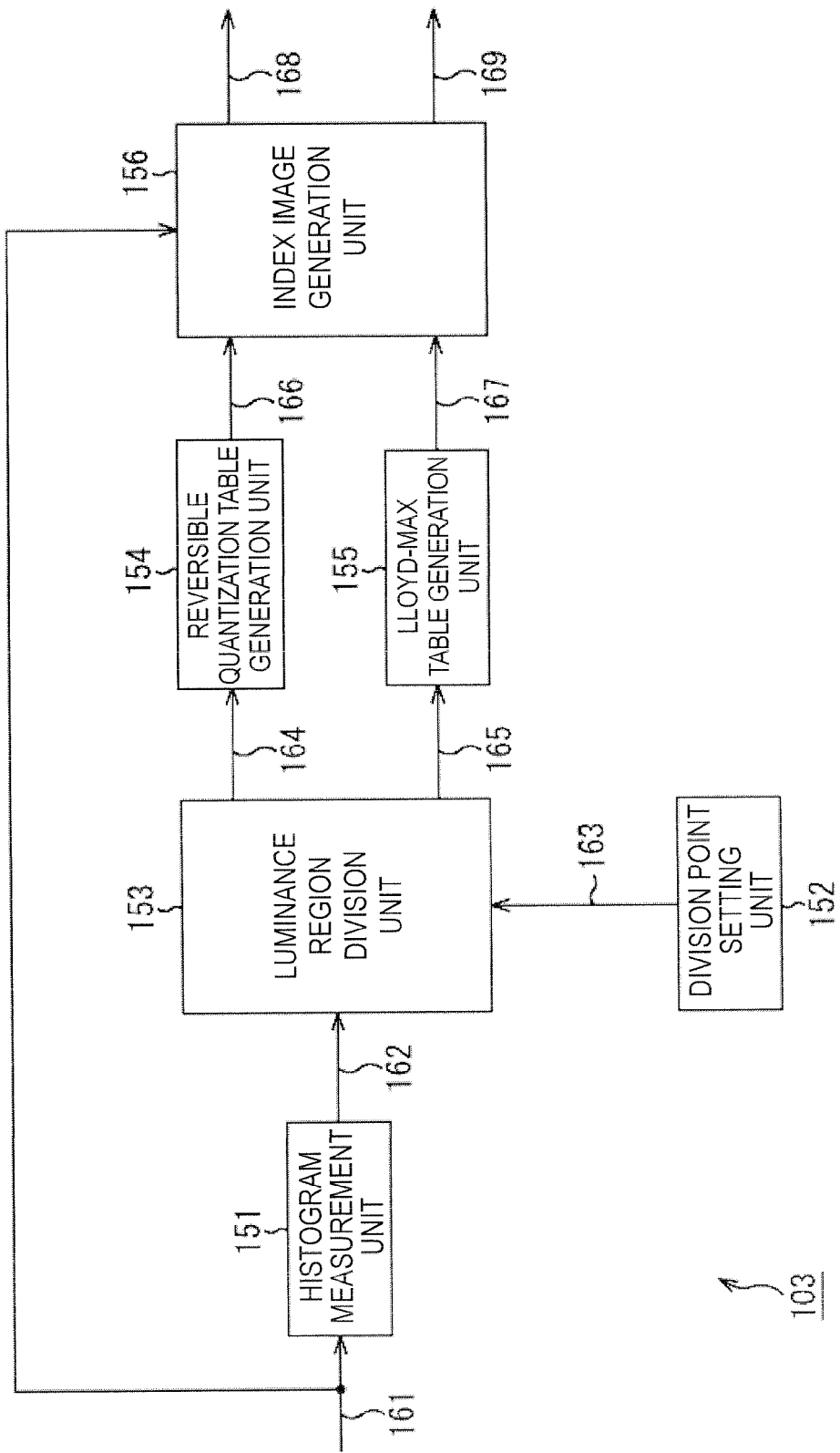
FIG. 4 is a block diagram illustrating an example of the main configuration of a quantization unit.

FIG. 4 is a block diagram illustrating an example of the main configuration of the quantization unit 103. As shown in FIG. 4, the quantization unit 103 includes a histogram measurement unit 151, a division point setting unit 152, a luminance region division unit 153, a reversible quantization table generation unit 154, a Lloyd-Max table generation unit 155, and an index image generation unit 156.

HDR image data 161 is input to the quantization unit 103. The HDR image data 161 corresponds to the HDR image data 113. That is, the HDR image data 161 is image data that is generated by performing logarithmic conversion on the HDR image data 111 expressed by a 32-bit floating point number and also performing the integer conversion (floating point number-to-integer conversion) on the converted HDR image data 111 and is expressed by an N-bit integer. The HDR image data 161 is supplied to the histogram measurement unit 151 and the index image generation unit 156.

The histogram measurement unit 151 generates a histogram H(k) (where k=0 to $2^N-1$) of the input HDR image data 161. The histogram measurement unit 151 investigates the distribution of the respective pixel values of the HDR image data 161 and generates a histogram (an appearance frequency distribution of the respective luminance values (pixel values)) H(k) shown in, for example, FIG. 5.

The histogram measurement unit 151 supplies the generated histogram H(k) 162 to the luminance region division unit 153.

The division point setting unit 152 sets a division point T that divides the luminance region in the histogram H(k) 162. Any luminance value can be set as the division point T (that is, the boundary between the luminance regions). A predetermined luminance value may be set as the division point T. For example, a luminance value set based on an instruction or a request from a user, an external processing unit, an external apparatus, or the like may be used.

Any number can be set as the number of division points T by the division point setting unit 152. Hereinafter, for example, the division point setting unit 152 is assumed to set one division point T. In this case, the division point setting unit 152 sets the division point T such that Expression (4) below is satisfied on the assumption that a low-luminance region R1 is the low-luminance region from the division point T, a high-luminance region R2 is a high-luminance region from the division point T, P1 is the number of valid luminance values which belong to the low-luminance region R1 and are luminance values for which the number of appearances is not zero, and P2 is the number of valid luminance values belonging to the high-luminance region R2.

$$P2 < 2^M \quad (4)$$

The division point setting unit 152 supplies information 163 indicating the luminance value of the set division point T to the luminance region division unit 153.

Figure 5:
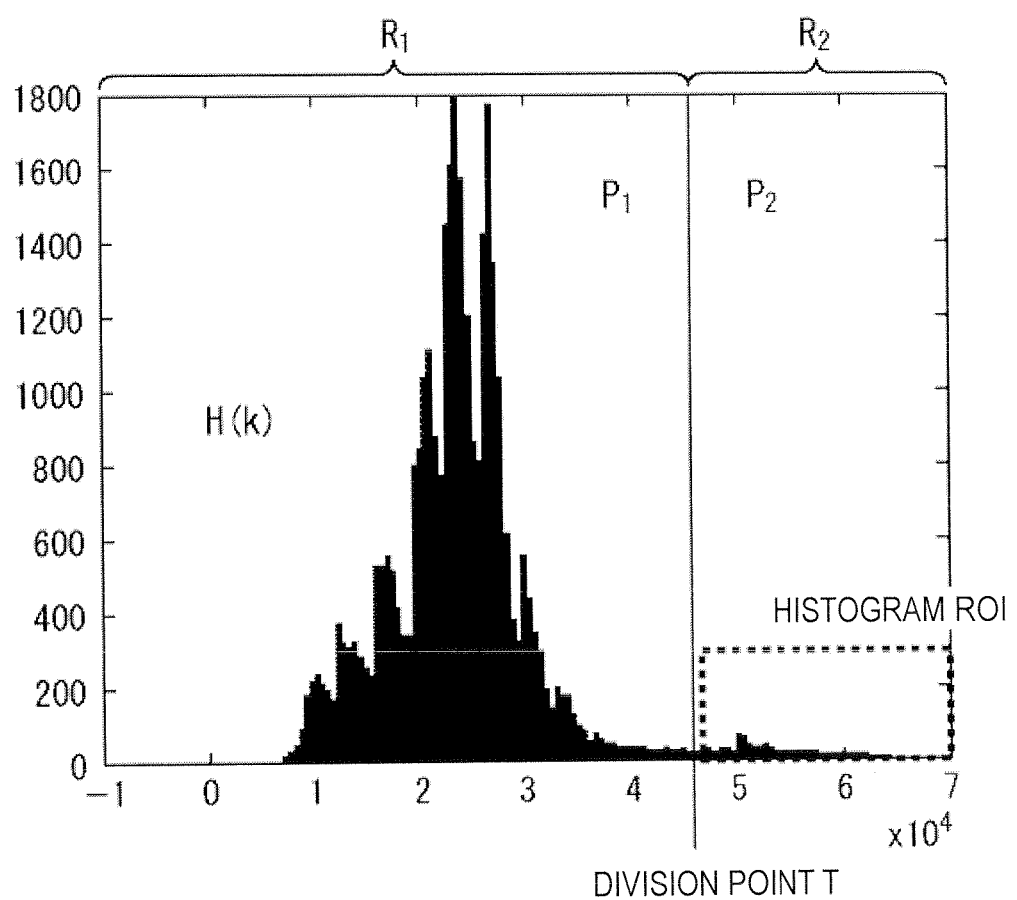
FIG. 5 is a diagram illustrating a histogram of an N-bit image and region division.

As shown in FIG. 5, the luminance region division unit 153 divides the luminance region of a histogram 162 supplied from the histogram measurement unit 151 into the low-luminance region R1 and the high-luminance region R2 using the division point T indicated by the information 163 supplied from the division point setting unit 152 as the boundary.

The luminance region division unit 153 supplies valid luminance values 165 of the low-luminance region R1 to the Lloyd-Max table generation unit 155 and supplies valid luminance values 164 of the high-luminance region R2 to the reversible quantization table generation unit 154. That is, P1 pieces of data (valid luminance values) are supplied to the Lloyd-Max table generation unit 155 and P2 pieces of data (valid luminance values) are supplied to the reversible quantization table generation unit 154.

The reversible quantization table generation unit 154 generates a quantization table Q (k2) (where k2=T+1 to $2^N-1$) for classifying P2 valid luminance values 164 into P2 classes in the high-luminance region R2. Further, the reversible quantization table generation unit 154 gives an index number to each class.

The reversible quantization table generation unit 154 determines the representative luminance value corresponding to each class (index, value) and generates a representative value table C(n2) (where n2=$2^M$-P2 to $2^M-1$).

Thus, the remaining valid luminance number to be quantized becomes $2^M$-P2.

The reversible quantization table generation unit 154 supplies table information 166 including the generated quantization table Q(k2) and the generated representative value table C(n2) to the index image generation unit 156.

The Lloyd-Max table generation unit 155 generates a quantization table Q (k1) (where k1=0 to T) for classifying P1 valid luminance values 165 into "$2^M$-P2" classes in the low-luminance region R1. Further, the Lloyd-Max table generation unit 155 gives an index number to each class.

The Lloyd-Max table generation unit 155 determines the representative luminance value corresponding to each class (index value) and generates a representative value table C(n1) (where n1=0 to $2^M$-P2-1).

The Lloyd-Max table generation unit 155 supplies table information 167 including the generated quantization table Q(k1) and the generated representative value table C(n1) to the index image generation unit 156.

The index image generation unit 156 synthesizes the quantization tables Q(k1) and Q(k2) to generate a quantization table Q(k) (where k=0 to $2^N-1$) for the entire luminance region. Further, the index image generation unit 156 synthesizes the representative value table C(n1) and the representative value table C(n2) to generate a representative table C(n) (where n=0 to $2^M-1$) for the entire luminance region.

The index image generation unit 156 quantizes the HDR image data 161 using the generated quantization table Q(k). For example, when an image O is assumed to be an image of the HDR image data 161, the index image generation unit 156 generates an index image I expressed by an M-bit integer from the image O expressed by an N-bit integer, as in Expression (5) below by performing mapping based on the quantization table Q(k).

$$I = Q(O) \quad (5)$$

That is, the index image generation unit 156 performs the irreversible Lloyd-Max quantization on the pixel values of the low-luminance region R1 in which the expansion of the error caused due to the inverse-processing function at the decoding time is relatively small (or no expansion of the error occurs) and performs the reversible quantization on the pixel values of the high-luminance region R2 in which the expansion of the error caused due to the inverse-processing function at the decoding time is relatively large.

Since the codomain of Q(k) is "$0 \leq Q(k) < 2^M$," the codomain of the generated index image I is also "$0 \leq Q(k) < 2^M$" and is expressed in M bits.

The index image generation unit 156 supplies the data (index image data 168 (corresponding to the index image data 114 in FIG. 1)) of the generated index image I to the JPEG2000 encoding unit 104 (see FIG. 1) so that JPEG2000 encoding unit 104 can encode the data in conformity with the JPEG2000 encoding scheme.

The index image generation unit 156 supplies table information 169 including the generated representative value table C(n) to the JPEG2000 encoding unit 104 (see FIG. 1) so that the JPEG2000 encoding unit 104 can encode the data in conformity with the JPEG2000 encoding scheme.

Thus, the quantization unit 103 can suppress the occurrence of the quantization error in the high-luminance region R2 in which the expansion of the error caused due to the above-described inverse-processing function is relatively large and can focus the quantization error on the low-luminance region R1 in which the expansion of the error caused due to the inverse-processing function at the decoding time is relatively small (or no expansion of the error occurs) by performing the above-described quantization. That is, the quantization unit 103 can suppress the entire error by performing the quantization, and thus can suppress the deterioration in the image quality of a decoded image even in the highly efficient encoding and decoding processes on the HDR image.

Flow of Encoding Process

Next, an example of the flow of the encoding process performed by the image encoding apparatus 100 will be described with reference to the flowchart of FIG. 6.

When the encoding process starts, the logarithmic conversion unit 101 of the image encoding apparatus 100 performs the logarithmic conversion on the high dynamic range image (HDR image) in step S101.

In step S102, the integer conversion unit 102 converts the HDR image subjected to the logarithmic conversion in the process of step S101 and expressed by a 32-bit floating point number into an HDR image expressed by an N-bit integer.

In step S103, the quantization unit 103 performs the quantization process on the HDR image expressed by the N-bit integer to generate an index image such that occurrence of an error is suppressed in a luminance region in which the expansion of the error caused due to the inverse-processing function at the decoding time is relatively large. The quantization process will be described in detail later.

In step S104, the JPEG2000 encoding unit 104 encodes the index image generated through the process of step S103 in conformity with the irreversible JPEG2000 encoding scheme.

In step S105, the JPEG2000 encoding unit 104 encodes the representative value table C(n) generated through the process of step S103 and adds (multiplexes) the encoded data to a predetermined position (for example, a header portion or a payload portion) of the encoded data of the index image.

The adding (multiplexing) includes associating the encoded data of the representative value table C(n) with the encoded data of the index image directly or indirectly. That is, the JPEG2000 encoding unit 104 may associate the generated encoded data with each other and may transmit or record both the encoded data. Both the associated encoded data may be transmitted or stored in accordance with different methods or at different timings. Further, both the encoded data may be recorded on different regions or different recording media, or may be transmitted through different media.

When the process of step S105 ends, the JPEG2000 encoding unit 104 outputs encoded data 115 and ends the encoding process.

Flow of Quantization Process

Next, an example of the flow of the quantization process performed in step S103 of FIG. 6 will be described with reference to the flowchart of FIG. 7.

When the quantization process starts, the histogram measurement unit 151 detects a histogram of the HDR image subjected to the logarithmic conversion and expressed by the N-bit integer to generate a histogram H(k) in step S121.

In step S122, the division point setting unit 152 sets a division point T.

In step S123, the luminance region division unit 153 divides the luminance region of the histogram generated in step S121 into regions at the division point T set in step S122.

In step S124, the reversible quantization table generation unit 154 generates the representative value table C(n2) and the quantization table Q(k2) for the reversible quantization on the pixels in the high-luminance region R2.

In step S125, the Lloyd-Max table generation unit 155 generates the representative value table C(n1) and the quantization table Q(k1) for the Lloyd-Max quantization on the pixels in the low-luminance region R1.

In step S126, the index image generation unit 156 generates the quantization table Q(k) using the quantization table Q(k2) for the reversible quantization generated in step S124 and the quantization table Q(k1) for the Lloyd-Max quantization generated in step S125 and quantizes the HDR image subjected to the logarithmic conversion and expressed by the N-bit integer using the quantization table Q(k) to generate the index image.

In step S127, the index image generation unit 156 supplies the index image generated through the process of step S126 to the JPEG2000 encoding unit 104 so that the JPEG2000 encoding unit 104 can encode the index image.

In step S128, the index image generation unit 156 generates the representative value table C(n) using the representative value table C(n2) for the reversible quantization generated in step S124 and the representative table C(n1) for the Lloyd-Max quantization generated in step s125. The index image generation unit 156 supplies the generated representative value table C(n) to the JPEG2000 encoding unit 104 so that the JPEG2000 encoding unit 104 can encode the representative value table C(n).

Figure 6:
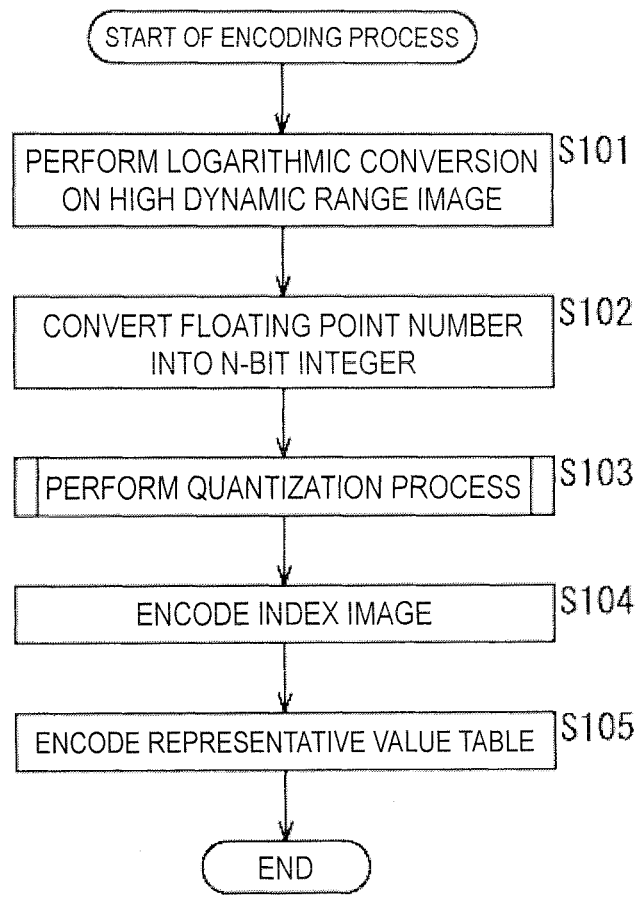
FIG. 6 is a flowchart illustrating an example of the flow of an encoding process.
Figure 7:
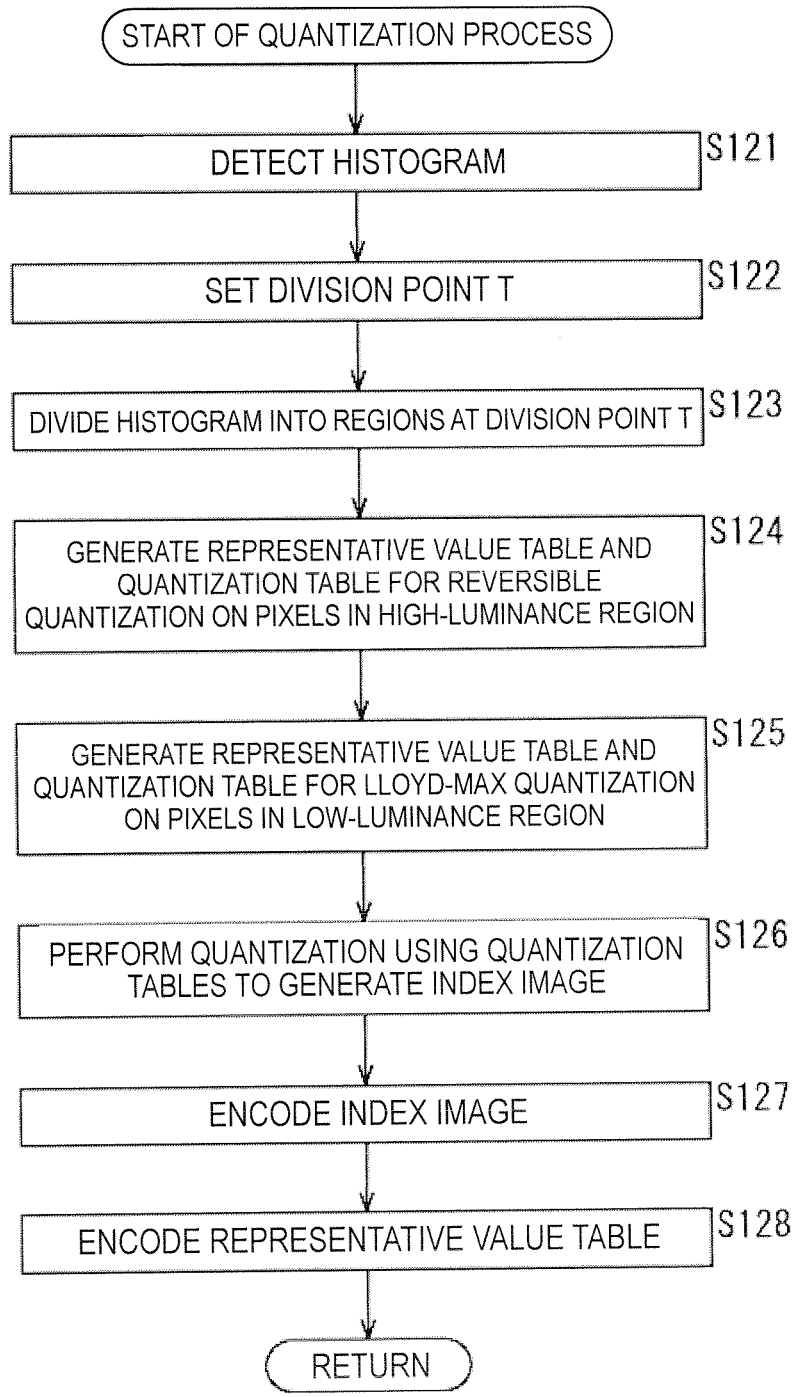
FIG. 7 is a flowchart illustrating an example of the flow of a quantization process.

When step S128 ends, the index image generation unit 156 ends the quantization process, and then the process returns to FIG. 6.

The image encoding apparatus 100 can suppress the deterioration in the image quality of a decoded image even in the highly efficient encoding and decoding processes on the HDR image by performing the above-described process.

The example of the configuration of the image encoding apparatus 100 has been shown in FIG. 1, but the configuration of the image encoding apparatus 100 is not limited to this example. The image encoding apparatus 100 may have any configuration, as long as the image encoding apparatus 100 includes the quantization unit 103 that performs the quantization on the HDR image subjected to the logarithmic conversion such that the quantization error is focused on the low-luminance region in which the expansion of the error caused due to the inverse-processing function at the decoding time is relatively small (or no expansion of the error occurs) and the JPEG2000 encoding unit 104 that encodes the index image quantized by the quantization unit 103.

The case in which the index image data 114 generated by the quantization unit 103 is encoded in conformity with the JPEG2000 encoding scheme has been described, but any encoding scheme may be used. That is, the JPEG2000 encoding unit 104 may encode the index image data 114 in conformity with any encoding scheme.

2. Second Embodiment

Image Decoding Apparatus

Next, a process of decoding the encoded data (code stream) generated by the image encoding apparatus 100 described in the first embodiment will be described.

Figure 8:
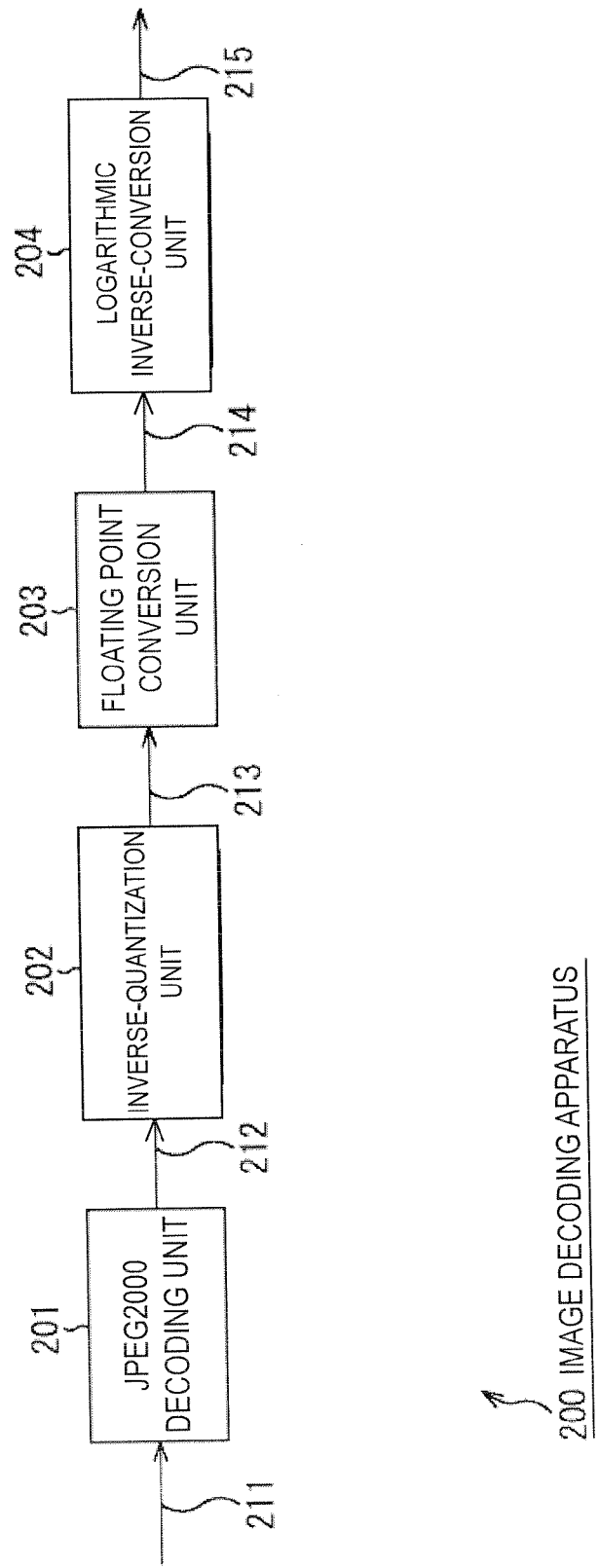
FIG. 8 is a block diagram illustrating an example of the main configuration of an image decoding apparatus.

FIG. 8 is a block diagram illustrating an example of the configuration of an image decoding apparatus. An image decoding apparatus 200 shown in FIG. 8 is an apparatus that decodes the encoded data (code stream) generated by the image encoding apparatus 100 to obtain a decoded image. That is, the image decoding apparatus 200 decodes encoded data (code stream) by quantizing an HDR image subjected to preprocessing such as logarithmic conversion such that a quantization error is focused on a low-luminance region in which the expansion of the error caused due to an inverse-processing function at the decoding time is relatively small (or no expansion of the error occurs) and then performing encoding.

That is, the image decoding apparatus 200 restores the HDR image by decoding the encoded data (code stream) in accordance with a method corresponding to the applied encoding method, performing inverse quantization in accordance with a method corresponding to the applied quantization method and performing inverse processing of the applied preprocessing.

As shown in FIG. 8, the image decoding apparatus 200 includes a JPEG2000 decoding unit 201, an inverse-quantization unit 202, a floating point number conversion unit 203, and a logarithmic inverse-conversion unit 204.

The JPEG2000 decoding unit 201 decodes encoded data (code stream) 211 input to the image decoding apparatus 200 in conformity with the JPEG2000 decoding scheme. That is, the JPEG2000 decoding unit 201 decodes the encoded data (code stream) 211 in accordance with a scheme corresponding to the encoding performed by the JPEG2000 encoding unit 104 in FIG. 1 to generate index image data 212. Further, when the JPEG2000 encoding unit 104 performs the encoding in conformity with a scheme other than the JPEG2000 encoding scheme, the JPEG2000 decoding unit 201 also performs the decoding in conformity with a scheme corresponding to the other scheme.

The generated index image data 212 (which is not identical to the index image data 114, since irreversible encoding and decoding are performed) is image data restored from the index image data 114 in FIG. 1.

The JPEG2000 decoding unit 201 supplies the generated index image data 212 to the inverse-quantization unit 202.

The JPEG2000 decoding unit 201 likewise decodes the encoded data of a representative value table C(n) input to the image decoding apparatus 200 and included in the encoded data (code stream) 211 or input to the image decoding apparatus 200 and associated with the encoded data (code stream) 211, and then supplies the decoded data to the inverse-quantization unit 202. As described above in the first embodiment, the representative value table C(n) is the representative value table C(n) generated by the quantization unit 103 and corresponds to the quantization table Q(k) used in the quantization performed by the quantization unit 103.

The inverse-quantization unit 202 performs inverse quantization on the supplied index image data 212 in accordance with a method corresponding to the quantization performed by the quantization unit 103. That is, the inverse-quantization unit 202 performs inverse quantization on the index image data 212 expressed by an M-bit integer to convert the index image data 212 into HDR image data 213 expressed by an N-bit integer. The HDR image data 213 (which is not identical to the HDR image data 113, since the irreversible encoding and decoding are performed) is image data restored from the HDR image data 113 in FIG. 1.

At this time, by performing inverse quantization using the representative value table C(n) supplied from the image encoding apparatus 100, the inverse-quantization unit 202 can correctly perform inverse quantization on an index value subjected to the reversible quantization in the high-luminance region in which the expansion of the error caused due to the inverse-processing function at the decoding time is relatively large and an index value subjected to the Lloyd-Max encoding (irreversible encoding) in the low-luminance region in which the expansion of the error caused due to the inverse-processing function at the decoding time is relatively small (or no expansion of the error occurs).

Accordingly, the inverse-quantization unit 202 can focus the quantization error on the low-luminance region in which the expansion of the error caused due to the inverse-processing function at the decoding time is relatively small (or no expansion of the error occurs). Thus, since the inverse-quantization unit 202 can suppress the entire error, the deterioration in the image quality of the decoded image can be suppressed even in the highly efficient encoding and decoding processes on the HDR image.

The inverse-quantization unit 202 supplies the HDR image data 213 to the floating point number conversion unit 203.

The floating point number conversion unit 203 performs the floating point number conversion (integer-to-floating point number conversion) on the supplied HDR image data 213 expressed by the N-bit integer in accordance with a method corresponding to the integer conversion (floating point number-to-integer conversion) performed by the integer conversion unit 102 to generate HDR image data 214 expressed by a floating point number. The HDR image data 214 (which is not identical to the HDR image data 112, since the irreversible encoding and decoding are performed) is image data restored from the HDR image data 112 in FIG. 1.

The floating point number conversion unit 203 supplies the HDR image data 214 to the logarithmic inverse-conversion unit 204.

The logarithmic inverse-conversion unit 204 performs logarithmic inverse-conversion (exponential conversion) on the supplied HDR image data 214 in accordance with a method corresponding to the logarithmic conversion performed by the logarithmic conversion unit 101 to generate HDR image data 215 expressed by a 32-bit floating point number. The HDR image data 215 (which is not identical to the HDR image data 111, since the irreversible encoding and decoding processes are performed) is image data restored from the HDR image data 111 in FIG. 1.

That is, the floating point number conversion unit 203 and the logarithmic inverse-conversion unit 204 perform inverse processing of the preprocessing performed by the logarithmic conversion unit 101 and the integer conversion unit 102. That is, for example, the floating point number conversion unit 203 and the logarithmic inverse-conversion unit 204 perform the conversion process (including the floating point number conversion or the logarithmic inverse-conversion) using the inverse-processing function shown in FIG. 2B.

The logarithmic inverse-conversion unit 204 outputs the HDR image data 215 to the outside of the image decoding apparatus 200. For example, the HDR image data 215 is transmitted to another apparatus, is recorded in a recording medium, is displayed as an image, or is subjected to any image processing.

Thus, since the inverse-quantization unit 202 performs the inverse quantization in accordance with a method corresponding to the quantization performed by the quantization unit 103 (using the representative value table C(n)), the image decoding apparatus 200 can suppress the error in the entire luminance region, thereby suppressing the deterioration in the image quality of the decoded image.

Inverse-Quantization Unit

Figure 9:
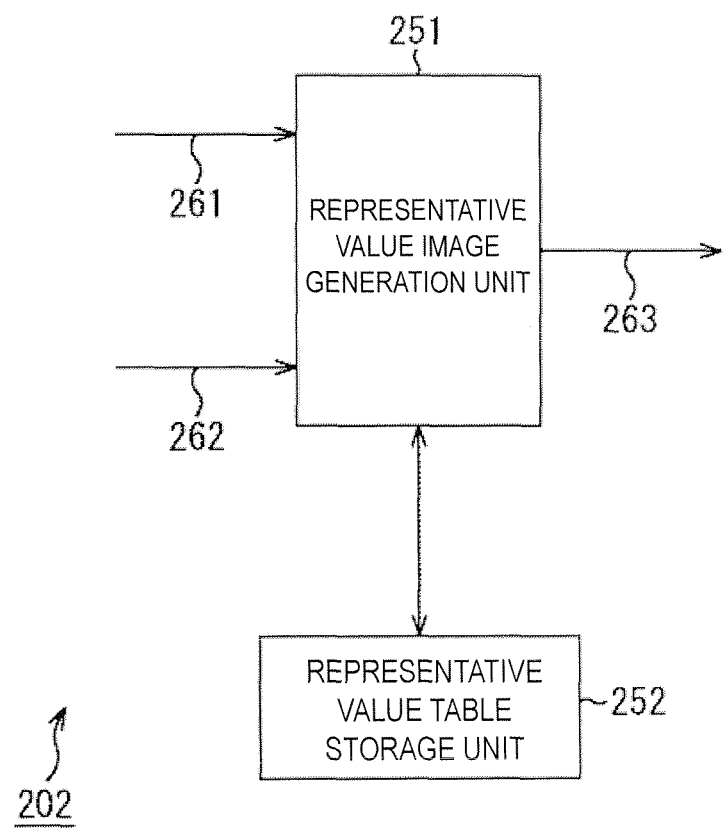
FIG. 9 is a block diagram illustrating an example of the main configuration of an inverse-quantization unit.

FIG. 9 is a block diagram illustrating an example of the main configuration of the inverse-quantization unit 202.

As shown in FIG. 9, the inverse-quantization unit 202 includes a representative value image generation unit 251 and a representative value table storage unit 252.

The representative value table C(n) 261 supplied from the JPEG2000 decoding unit 201 in FIG. 8 is supplied to the representative value image generation unit 251. The representative value image generation unit 251 supplies the representative value table C(n) to the representative value table storage unit 252 and stores the representative value table C(n).

Index image data 262 is supplied from the JPEG2000 decoding unit 201 to the representative image generation unit 251. The index image data 262 corresponds to the index image data 212 in FIG. 8.

The representative value image generation unit 251 performs inverse quantization on the index image data 262 using the representative value table C(n) stored in the representative value table storage unit 252. For example, the representative value image generation unit 251 displaces each index value of an index image I with a representative value of the representative value table C(n) corresponding to each index value, as in Expression (6) below. Thus, the index image I is converted into HDR image O' with an N-bit integer.

$$O' = C(I) \quad (6)$$

Data 263 of the image (representative value image) with the generated representative values corresponds to the HDR image data 213 in FIG. 8.

Thus, the representative value image generation unit 251 can correctly perform the inverse quantization on the index value of each region quantization in accordance with a method corresponding to the quantization method by performing the inverse quantization based on the representative value table C(n).

For example, the representative value image generation unit 251 can perform the Lloyd-Max inverse-quantization on the index value of the low-luminance region R1 subjected to the Lloyd-Max quantization and can perform reversible inverse-quantization on the index value of the high-luminance region R2 subjected to the reversible quantization.

Accordingly, the inverse-quantization unit 202 can suppress the entire error, thereby suppressing the deterioration in the image quality of the decoded image even in the highly efficient encoding and decoding processes on the HDR image.

Flow of Decoding Process

Next, an example of the flow of the decoding process performed by the image decoding apparatus 200 will be described with reference to the flowchart of FIG. 10.

When the decoding process starts, the JPEG2000 decoding unit 201 of the image decoding apparatus 200 decodes the encoded data (code stream) of the representative table C(n) in step S201.

In step S202, the JPEG2000 decoding unit 201 decodes the encoded data (code stream) of the index image.

In step S203, the inverse-quantization unit 202 performs inverse quantization on the index image decoded in step S202 using the representative value table C(n) decoded in step S201 such that the occurrence of the error is suppressed in the luminance region in which expansion of the error caused due to the inverse-processing function is relatively large.

In step S204, the floating point conversion unit 203 performs the floating point number conversion on the HDR image data subjected to the inverse quantization in step S203 to convert the N-bit integer into a floating point number.

In step S205, the logarithmic inverse-conversion unit 204 performs the logarithmic inverse-conversion (exponential conversion) on the HDR image data subjected to the floating point number in step S204 to generate a high dynamic range image expressed by a 32-bit floating point number, and then outputs the high dynamic range image.

When the process of step S205 ends, the logarithmic inverse-conversion unit 204 ends the decoding process.

Flow of Inverse-Quantization Process

Next, an example of the flow of the inverse-quantization process performed in step S203 of FIG. 10 will be described with reference to the flowchart of FIG. 11.

When the inverse-quantization process starts, in step S221, the representative value image generation unit 251 acquires the representative value table C(n) decoded in step S201. The representative value table C(n) is retained in the representative value table storage unit 252.

In step S222, the representative value image generation unit 251 acquires the index image decoded in step S202.

In step S223, the representative value image generation unit 251 performs the inverse quantization on the index image acquired in step S222 using the representative value table C(n) acquired in step S221 to generate the representative value image.

Figure 10:
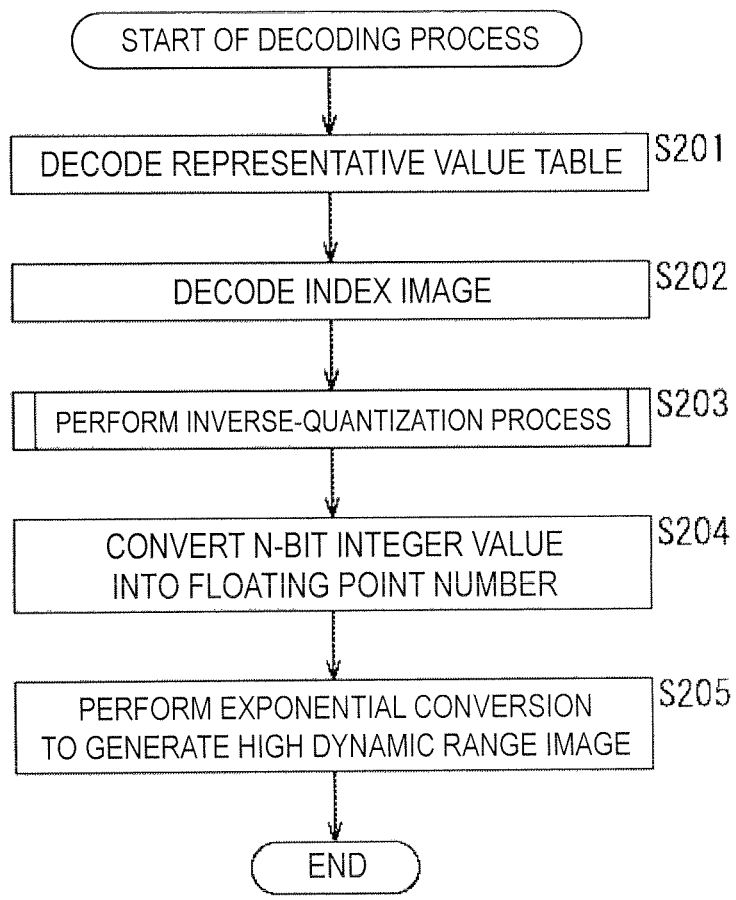
FIG. 10 is a flowchart illustrating an example of the flow of a decoding process.
Figure 11:
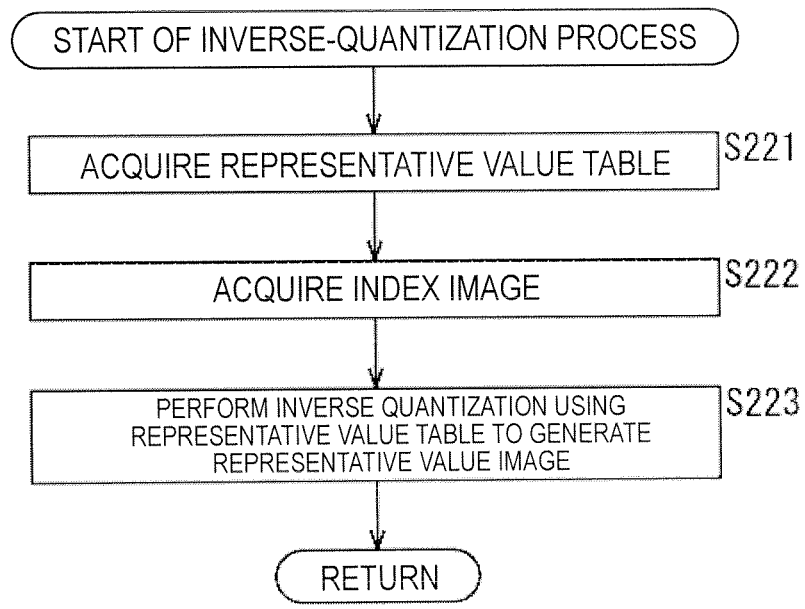
FIG. 11 is a flowchart illustrating an example of the flow of an inverse-quantization process.

When the process of step S223 ends, the representative value image generation unit 251 ends the inverse-quantization process and the process returns to FIG. 10.

By performing each process described above, the image decoding apparatus 200 can correctly perform the inverse quantization on the index value of each region in accordance with the method corresponding to the quantization method. Therefore, the deterioration in the image quality of the decoded image can be suppressed even in the highly efficient encoding and decoding processes on the HDR image.

FIG. 8 shows the example of the configuration of the image decoding apparatus 200. However, the configuration of the image decoding apparatus 200 is not limited to this example. As described above, the image decoding apparatus 200 may have any configuration, as long as the image decoding apparatus 200 includes the JPEG2000 decoding unit 201 that decodes the encoded data (code stream) in accordance with the scheme corresponding to the encoding scheme; and the inverse-quantization unit 202 that performs the inverse quantization such that the quantization error is focused on the low-luminance region in which the expansion of the error caused due to the inverse-processing function is relatively small (or no expansion of the error occurs).

3. Third Embodiment

Simulation

FIG. 12 is a diagram illustrating an example of simulation results of the image encoding and decoding processes described above.

In the table shown in FIG. 12, nave, rosette, memorial, Desk, rend02, StillLife, and Apartment in the column of Image indicate kinds of images. These images are images that have different characteristics from one another.

Further, a suggested method, a past method [4], and Lloyd [9] indicate encoding and decoding methods. The suggested method is a method of performing the preprocessing including the logarithmic conversion and the inverse processing corresponding to the preprocessing at the encoding and decoding times, and also performing the quantization and the inverse quantization such that the quantization error is focused on the low-luminance region in which the expansion of the error caused due to the inverse-processing function at the decoding time is relatively small (or no expansion of the error occurs) when the encoding and decoding processes are performed, as described above in the first and second embodiments. The past method [4] is a method of performing preprocessing including logarithmic conversion and performing the inverse processing corresponding to the preprocessing when the encoding and decoding processes are performed. Lloyd [9] is a method of performing the Lloyd-Max quantization and the Lloyd-Max inverse-quantization on the entire luminance region when the encoding and decoding processes are performed.

That is, in the simulation shown in the table of FIG. 12, the above-described images are processed in accordance with the suggested method, the past method [4], and Lloyd [9] and each result is evaluated with a signal-to-noise ratio (SNR) [dB].

Each value in the column of SNR (HDR) in the table of FIG. 12 indicates an SNR [dB]. Each value in the column of File Size [Kb] indicates the file size of encoded data.

As shown in the table of FIG. 12, the suggested method according to the embodiment of the present disclosure can improve the image quality of the decoded image more than the past method [4] or Lloyd [9] when the decoded images are compared at the same compression ratio. That is, in the suggested method according to the embodiment of the present disclosure, the deterioration in the image quality of the decoded image can be suppressed even in the highly efficient encoding and decoding processes on the HDR image.

Each apparatus described above may, of course, include a unit other than the above-described configuration. Fnr example, each apparatus may include an apparatus or a device using an image captured from an imaging element (a CMOS or a CCD sensor), a compression circuit writing an imaging-element image in a memory, a digital still camera, a moving-image camcorder, a medical image camera, a medical endoscope, a monitoring camera, a digital cinema photographing camera, a binocular image camera, a multi-ocular camera, a memory reduction circuit in an LSI chip, or an authoring tool on a PC or a software module of the authoring tool. Each apparatus may be configured as a single apparatus or may be configured as a system including a plurality of apparatuses.

4. Fourth Embodiment

Personal Computer

The series of processes described above may be executed by hardware or software. In this case, for example, a personal computer shown in FIG. 13 may be configured.

Figure 13:
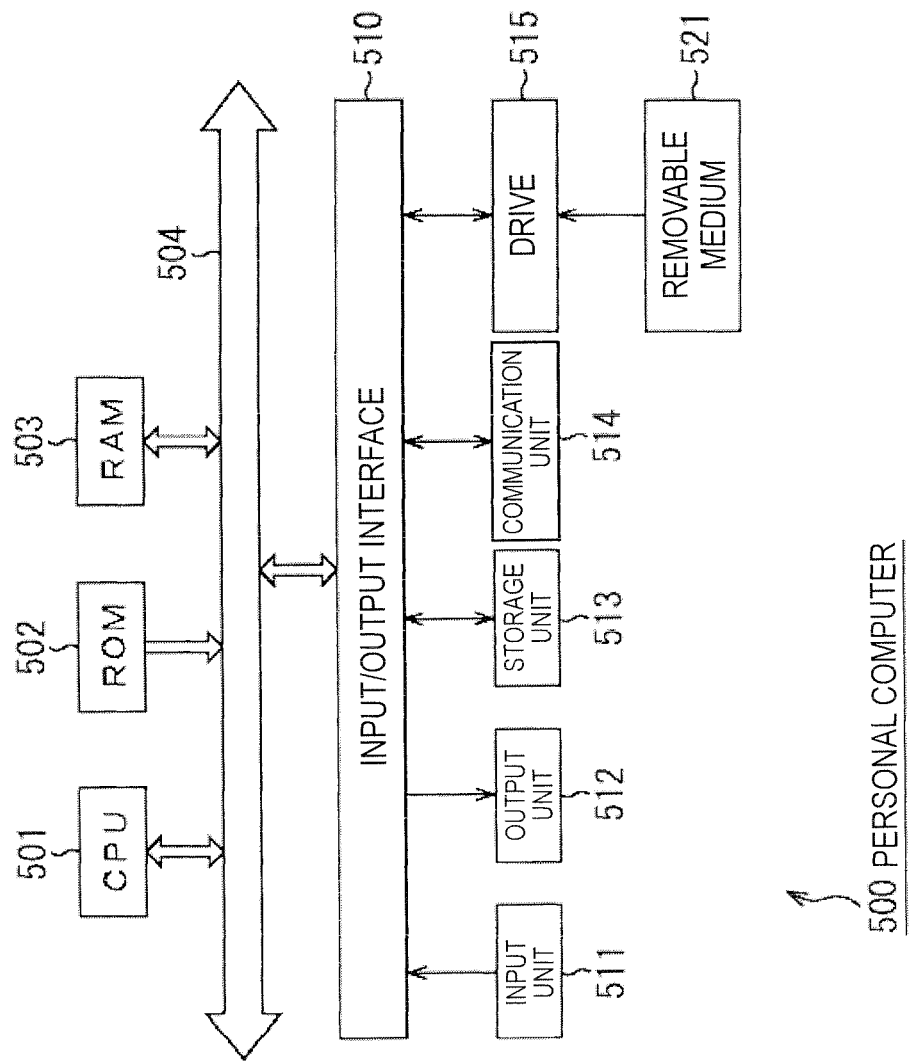
FIG. 13 is a block diagram illustrating an example of the main configuration of a personal computer.

In FIG. 13, a central processing unit (CPU) 501 of a personal computer 500 executes various kinds of processes in accordance with a program stored in a read-only memory (ROM) 502 or a program loaded from the storage unit 513 to a random access memory (RAM) 503. In the RAM 503, various kinds of processes are executed by the CPU 501 and necessary data or the like is appropriately stored.

The CPU 501, the ROM 502, and the RAM 503 are connected to each other via a bus 504. An input/output interface 510 is also connected to the bus 504.

An input unit 511 configured by a keyboard, a mouse, or the like, an output unit 512 configured by a display such as a cathode ray tube (CRT) display or a liquid crystal display (LCD) and a speaker or the like, a storage unit 513 configured by a hard disk, a solid state drive (SSD) such as a flash memory, or the like, and a communication unit 514 configured by an interface of a wired local area network (LAN) or a wireless LAN, a modem, or the like are connected to the input/output interface 510. The communication unit 514 performs communication via a network including the Internet.

A drive 515 is connected to the input/output interface 510, as necessary. A removable medium 521 such as a magnetic disk, an optical disc, a magneto-optical disc, or a semiconductor memory is appropriately mounted on the drive 515 so that a computer program read from the removable medium 521 is installed in the storage unit 513, as necessary.

When the series of processes described above are executed by software, a program of the software is installed from a network or a recording medium.

For example, as shown in FIG. 13, the recording medium is configured by the removable medium 521 such as a magnetic disk (including a flexible disk), an optical disc (including a compact disc-read-only memory (CD-ROM) and a digital versatile disc (DVD)), a magneto-optical disc (including a mini disc (MD)), or a semiconductor memory that stores the program distributed to deliver the program to users separately from the apparatus body. The recording medium is also configured by the ROM 502, a hard disk included in the storage unit 513, or the like that stores the program distributed to the users in such a way that the program is embedded in the apparatus body.

The program executed by a computer may be a program processed chronologically in the order described in the specification or may be a program processed in parallel or a necessary timing such as a called time.

In the specification, the steps describing the program recorded in a recording medium include processes which are performed chronologically in the described order and, of course, include processes which are not necessarily processed chronologically but processed in parallel or separately.

In the specification, the system refers to the entire apparatus including a plurality of devices (apparatuses).

The configuration described as one apparatus (or processing unit) may be realized by a plurality of apparatuses (or processing units). Conversely, the configuration described as the plurality of apparatuses (or processing units) may be realized collectively by one apparatus (or processing unit). Further, a configuration other than the above-described configuration may, of course, be added to the configuration of each apparatus (or processing unit). Furthermore, when the configurations or operations in the entire system are substantially the same as each other, part of the configuration of a given apparatus (or processing unit) may be included in the configuration of another apparatus (or another processing unit). That is, embodiments of the present disclosure are not limited to the above-described embodiment, but may be modified in various ways within the scope not departing from the gist of the present disclosure.

Additionally, the present technology may also be configured as below.

(1) An image processing apparatus including:

a quantization unit that quantizes an image subjected to logarithmic conversion such that a quantization error is focused on a luminance region in which expansion of an error caused due to logarithmic inverse-conversion which is inverse conversion of the logarithmic conversion is relatively small or a luminance region in which no expansion of the error occurs; and an encoding unit that encodes an index image obtained through the quantization by the quantization unit.

(2) The image processing apparatus according to (1), wherein the quantization unit includes a histogram generation unit that generates a histogram of each luminance value of the image subjected to the logarithmic conversion, a luminance region division unit that divides an entire luminance region of the histogram generated by the histogram generation unit into a plurality of partial luminance regions, a table generation unit that generates a quantization table indicating a correspondence relation between each luminance value and an index value and a representative value table indicating a correspondence relation between each index value and a representative value of each class for each of the partial luminance regions divided from the entire luminance region by the luminance region division unit, and an index image generation unit that generates the index image by quantizing the image subjected to the logarithmic conversion using the quantization table for each partial luminance region generated by the table generation unit.

(3) The image processing apparatus according to (2), wherein the table generation unit generates the quantization table and the representative value table such that, among the plurality of partial luminance regions, the quantization error is focused on the partial luminance region in which the expansion of the error caused due to the logarithmic inverse-conversion is relatively small or the partial luminance region in which no expansion of the error occurs.

(4) The image processing apparatus according to (3), wherein the table generation unit generates the quantization table and the representative value table for the partial luminance region in which the expansion of the error caused due to the logarithmic inverse-conversion is relatively small or the partial luminance region in which no expansion of the error occurs in accordance with a quantization method in which the quantization error occurs, and generates the quantization table and the representative value table for the other partial luminance regions in accordance with a quantization method in which the quantization error does not occur.

(5) The image processing apparatus according to (4), wherein the luminance region division unit divides, using a predetermined division point as a boundary, the entire luminance region of the histogram into a low-luminance region of low luminance from the predetermined division point and a high-luminance region of high luminance from the predetermined division point, and wherein the table generation unit generates the quantization table and the representative value table of Lloyd-Max quantization for the low-luminance region in which the expansion of the error caused due to the logarithmic inverse-conversion is relatively small or the low-luminance region in which no expansion of the error occurs, and generates the quantization table and the representative value table of reversible quantization for the high-luminance region in which the expansion of the error caused due to the logarithmic inverse-conversion is relatively large.

(6) The image processing apparatus according to (5), wherein the encoding unit encodes the representative value table generated by the table generation unit.

(7) The image processing apparatus according to (6), wherein the encoding unit adds encoded data of the generated representative value table to encoded data of the generated index image.

(8) The image processing apparatus according to (6), wherein the encoding unit associates encoded data of the generated representative value table with encoded data of the generated index image.

(9) The image processing apparatus according to any one of (5) to (8), wherein the quantization unit further includes a division point setting unit that sets the division point, and wherein the luminance region division unit divides the entire luminance region of the histogram into the low-luminance region and the high-luminance region using the division point set by the division point setting unit as the boundary.

(10) The image processing apparatus according to any one of (1) to (9), wherein the encoding unit encodes the index image in conformity with a JPEG2000 scheme.

(11) The image processing apparatus according to any one of (1) to (10), wherein the image is a high dynamic range image.

(12) The image processing apparatus according to any one of (1) to (11), further including:

a logarithmic conversion unit that performs the logarithmic conversion on an image to be encoded, wherein the quantization unit quantizes the image subjected to the logarithmic conversion by the logarithmic conversion unit such that the quantization error is focused on the luminance region in which the expansion of the error caused due to the logarithmic inverse-conversion is relatively small or the luminance region in which no expansion of the error occurs.

(13) The image processing apparatus according to (12), further including:

an integer conversion unit that performs floating point number-to-integer conversion on the image subjected to the logarithmic conversion by the logarithmic conversion unit and expressed by a floating point number, wherein the quantization unit quantizes the image subjected to the floating point number-to-integer conversion by the integer conversion unit such that the quantization error is focused on the luminance region in which the expansion of the error caused due to the logarithmic inverse-conversion is relatively small or the luminance region in which no expansion of the error occurs.

(14) An image processing method of an image processing apparatus, including:

quantizing, by a quantization unit, an image subjected to logarithmic conversion such that a quantization error is focused on a luminance region in which expansion of an error caused due to logarithmic inverse-conversion which is inverse conversion of the logarithmic conversion is relatively small or a luminance region in which no expansion of the error occurs; and encoding, by an encoding unit, an index image obtained through the quantization.

(15) An image processing apparatus including:

a decoding unit that decodes encoded data generated by encoding an index image which is obtained through quantization performed on an image subjected to logarithmic conversion such that a quantization error is focused on a luminance region in which expansion of an error caused due to logarithmic inverse-conversion which is inverse conversion of the logarithmic conversion is relatively small or a luminance region in which no expansion of the error occurs in accordance with a method corresponding to the encoding of generating the encoded data; and an inverse-quantization unit that performs inverse quantization corresponding to the quantization on the index image obtained by decoding the encoded data by the decoding unit.

(16) The image processing apparatus according to (15), wherein the decoding unit decodes not only the encoded data of the index image but also encoded data of a representative value table corresponding to a quantization table applied in the quantization.

(17) The image processing apparatus according to (16), wherein the inverse-quantization unit performs the inverse quantization on the index image using the representative value table decoded by the decoding unit.

(18) The image processing apparatus according to (17), further including:
 a floating point number conversion unit that performs integer-to-floating point number conversion on the image obtained by performing the inverse quantization on the index image by the inverse-quantization unit and expressed by an integer.

(19) The image processing apparatus according to (18), further including:
 a logarithmic inverse-conversion unit that performs logarithmic inverse-conversion on the image obtained through the integer-to-floating point number conversion by the floating point number conversion unit and expressed by a floating point number.

(20) An image processing method of an image processing apparatus, including:
 decoding, by a decoding unit, encoded data generated by encoding an index image which is obtained through quantization performed on an image subjected to logarithmic conversion such that a quantization error is focused on a luminance region in which expansion of an error caused due to logarithmic inverse-conversion which is inverse conversion of the logarithmic conversion is relatively small or a luminance region in which no expansion of the error occurs in accordance with a method corresponding to the encoding of generating the encoded data; and
 performing, by an inverse-quantization unit, inverse quantization corresponding to the quantization on the index image obtained by decoding the encoded data.

It should be understood by those skilled in the art that various modifications, combinations, sub-combinations and alterations may occur depending on design requirements and other factors insofar as they are within the scope of the appended claims or the equivalents thereof.

The present disclosure contains subject matter related to that disclosed in Japanese Priority Patent Application JP 2011-251751 filed in the Japan Patent Office on Nov. 17, 2011, the entire content of which is hereby incorporated by reference.

What is claimed is:

1. An image processing apparatus comprising:
 a quantization unit that quantizes an image subjected to logarithmic conversion such that a quantization error is focused on a luminance region in which expansion of an error caused due to logarithmic inverse-conversion which is inverse conversion of the logarithmic conversion is relatively small or a luminance region in which no expansion of the error occurs; and
 an encoding unit that encodes an index image obtained through the quantization by the quantization unit.

2. The image processing apparatus according to claim 1, wherein the quantization unit includes
 a histogram generation unit that generates a histogram of each luminance value of the image subjected to the logarithmic conversion,
 a luminance region division unit that divides an entire luminance region of the histogram generated by the histogram generation unit into a plurality of partial luminance regions,
 a table generation unit that generates a quantization table indicating a correspondence relation between each luminance value and an index value and a representative value table indicating a correspondence relation between each index value and a representative value of each class for each of the partial luminance regions divided from the entire luminance region by the luminance region division unit, and
 an index image generation unit that generates the index image by quantizing the image subjected to the logarithmic conversion using the quantization table for each partial luminance region generated by the table generation unit.

3. The image processing apparatus according to claim 2, wherein the table generation unit generates the quantization table and the representative value table such that, among the plurality of partial luminance regions, the quantization error is focused on the partial luminance region in which the expansion of the error caused due to the logarithmic inverse-conversion is relatively small or the partial luminance region in which no expansion of the error occurs.

4. The image processing apparatus according to claim 3, wherein the table generation unit generates the quantization table and the representative value table for the partial luminance region in which the expansion of the error caused due to the logarithmic inverse-conversion is relatively small or the partial luminance region in which no expansion of the error occurs in accordance with a quantization method in which the quantization error occurs, and generates the quantization table and the representative value table for the other partial luminance regions in accordance with a quantization method in which the quantization error does not occur.

5. The image processing apparatus according to claim 4,
 wherein the luminance region division unit divides, using a predetermined division point as a boundary, the entire luminance region of the histogram into a low-luminance region of low luminance from the predetermined division point and a high-luminance region of high luminance from the predetermined division point, and
 wherein the table generation unit generates the quantization table and the representative value table of Lloyd-Max quantization for the low-luminance region in which the expansion of the error caused due to the logarithmic inverse-conversion is relatively small or the low-luminance region in which no expansion of the error occurs, and generates the quantization table and the representative value table of reversible quantization for the high-luminance region in which the expansion of the error caused due to the logarithmic inverse-conversion is relatively large.

6. The image processing apparatus according to claim 5, wherein the encoding unit encodes the representative value table generated by the table generation unit.

7. The image processing apparatus according to claim 6, wherein the encoding unit adds encoded data of the generated representative value table to encoded data of the generated index image.

8. The image processing apparatus according to claim 6, wherein the encoding unit associates encoded data of the generated representative value table with encoded data of the generated index image.

9. The image processing apparatus according to claim 5,
 wherein the quantization unit further includes a division point setting unit that sets the division point, and
 wherein the luminance region division unit divides the entire luminance region of the histogram into the low-luminance region and the high-luminance region using the division point set by the division point setting unit as the boundary.

10. The image processing apparatus according to claim 1, wherein the encoding unit encodes the index image in conformity with a JPEG2000 scheme.

11. The image processing apparatus according to claim 1, wherein the image is a high dynamic range image.

12. The image processing apparatus according to claim 1, further comprising:
a logarithmic conversion unit that performs the logarithmic conversion on an image to be encoded,
wherein the quantization unit quantizes the image subjected to the logarithmic conversion by the logarithmic conversion unit such that the quantization error is focused on the luminance region in which the expansion of the error caused due to the logarithmic inverse-conversion is relatively small or the luminance region in which no expansion of the error occurs.

13. The image processing apparatus according to claim 12, further comprising:
an integer conversion unit that performs floating point number-to-integer conversion on the image subjected to the logarithmic conversion by the logarithmic conversion unit and expressed by a floating point number,
wherein the quantization unit quantizes the image subjected to the floating point number-to-integer conversion by the integer conversion unit such that the quantization error is focused on the luminance region in which the expansion of the error caused due to the logarithmic inverse-conversion is relatively small or the luminance region in which no expansion of the error occurs.

14. An image processing method of an image processing apparatus, comprising:
quantizing, by a quantization unit, an image subjected to logarithmic conversion such that a quantization error is focused on a luminance region in which expansion of an error caused due to logarithmic inverse-conversion which is inverse conversion of the logarithmic conversion is relatively small or a luminance region in which no expansion of the error occurs; and
encoding, by an encoding unit, an index image obtained through the quantization.

15. An image processing apparatus comprising:
a decoding unit that decodes encoded data generated by encoding an index image which is obtained through quantization performed on an image subjected to logarithmic conversion such that a quantization error is focused on a luminance region in which expansion of an error caused due to logarithmic inverse-conversion which is inverse conversion of the logarithmic conversion is relatively small or a luminance region in which no expansion of the error occurs in accordance with a method corresponding to the encoding of generating the encoded data; and
an inverse-quantization unit that performs inverse quantization corresponding to the quantization on the index image obtained by decoding the encoded data by the decoding unit.

16. The image processing apparatus according to claim 15, wherein the decoding unit decodes not only the encoded data of the index image but also encoded data of a representative value table corresponding to a quantization table applied in the quantization.

17. The image processing apparatus according to claim 16, wherein the inverse-quantization unit performs the inverse quantization on the index image using the representative value table decoded by the decoding unit.

18. The image processing apparatus according to claim 17, further comprising:
a floating point number conversion unit that performs integer-to-floating point number conversion on the image obtained by performing the inverse quantization on the index image by the inverse-quantization unit and expressed by an integer.

19. The image processing apparatus according to claim 18, further comprising:
a logarithmic inverse-conversion unit that performs logarithmic inverse-conversion on the image obtained through the integer-to-floating point number conversion by the floating point number conversion unit and expressed by a floating point number.

20. An image processing method of an image processing apparatus, comprising:
decoding, by a decoding unit, encoded data generated by encoding an index image which is obtained through quantization performed on an image subjected to logarithmic conversion such that a quantization error is focused on a luminance region in which expansion of an error caused due to logarithmic inverse-conversion which is inverse conversion of the logarithmic conversion is relatively small or a luminance region in which no expansion of the error occurs in accordance with a method corresponding to the encoding of generating the encoded data; and
performing, by an inverse-quantization unit, inverse quantization corresponding to the quantization on the index image obtained by decoding the encoded data.

* * * * *